US005673333A

United States Patent [19]

Johnston

[11] Patent Number: 5,673,333

[45] Date of Patent: Sep. 30, 1997

[54] DEPOSITORY APPARATUS FOR ENVELOPES AND SINGLE SHEETS

[75] Inventor: Adam J. L. Johnston, Dundee, Scotland

[73] Assignee: NCR Corporation, Dayton, Ohio

[21] Appl. No.: 311,244

[22] Filed: Sep. 23, 1994

[30] Foreign Application Priority Data

Nov. 15, 1993 [GB] United Kingdom .................... 9323709

[51] Int. Cl.[6] .................................................. G06K 9/62

[52] U.S. Cl. ............................................ 382/137; 235/379

[58] Field of Search ..................................... 382/137, 138, 382/139, 140; 235/379; 209/534

[56] References Cited

U.S. PATENT DOCUMENTS

| | | | |
|---|---|---|---|
| 4,523,330 | 6/1985 | Cain | 382/140 |
| 4,949,392 | 8/1990 | Barski et al. | 382/170 |
| 5,034,985 | 7/1991 | Keough | 382/101 |
| 5,076,441 | 12/1991 | Gerlier | 209/534 |
| 5,119,433 | 6/1992 | Will | 382/138 |
| 5,136,144 | 8/1992 | Swinton et al. | 235/379 |
| 5,422,467 | 6/1995 | Graef et al. | 235/379 |

FOREIGN PATENT DOCUMENTS

| | | |
|---|---|---|
| 0247361 | 4/1987 | European Pat. Off. . |
| 0247361 | 12/1987 | European Pat. Off. . |
| 2225891 | 6/1990 | United Kingdom . |
| 2238415A | 5/1991 | United Kingdom . |

*Primary Examiner*—Michael T. Razavi
*Assistant Examiner*—Jon Chang
*Attorney, Agent, or Firm*—Michael Chan; Elmer Wargo

[57] ABSTRACT

A depository apparatus (10) includes a common entry slot (14) for receiving both envelopes and single sheet financial documents such as checks. A thickness sensor (58) adjacent to the entry slot (14) provides an output indicative of whether a deposit item has a thickness of at least one millimeter, which is normally indicative that the item is an envelope. A document transport (34) and divert gates (50, 52) route items having a thickness of at least one millimeter into an envelope feed path for further processing, and route items of less than this thickness into a financial document feed path for further processing. An imager (76) generates a digital image of items routed into the document feed path, this image being processed to determine if the item is a document of predetermined type. The imager (76) enables the apparatus to detect if a thin envelope has been incorrectly routed into the document feed path.

14 Claims, 4 Drawing Sheets

DEPOSITORY APPARATUS FOR ENVELOPES AND SINGLE SHEETS

BACKGROUND OF THE INVENTION

This invention relates to a depository apparatus. The invention is concerned in particular with a depository apparatus for receiving deposit items comprising single sheets and deposits contained within envelopes.

The invention has application, for example, to a depository apparatus included in an automated teller machine (ATM) of the kind which is arranged to carry out a financial transaction, such as dispensing currency notes or accepting a deposit in the form of an envelope or a single sheet financial document such as a cheque or payment slip. As is well known, in operation of an ATM of this kind, a user inserts a customer identification card into the machine and then enters certain data (such as a personal identification number, type of transaction, etc.) on one or more keyboards included in a user interface of the machine. The machine then processes the transaction, dispenses currency notes or accepts a deposit item as may be requested, and returns the card to the user as part of a routine operation. If an envelope is to be deposited, the user typically inserts the envelope through a deposit entry slot in the user interface, and the depository apparatus of the ATM transports the envelope to, and deposits it in, a container included in the apparatus. If a single sheet financial document is deposited, the document is transported to reading and printing means for automatic processing of the document, after which the document is deposited in separate a container means.

From European Patent EP-B-0247361 there is known a depository apparatus which accepts envelopes and single sheet documents through a common entry slot. The depository distinguishes between envelopes and single sheet documents merely through the use of a thickness sensor. If a deposit item is identified as an envelope by the thickness sensor, it passes along a substantially direct main transport path to a document deposit stack. If the deposit item is identified as a single sheet document (cheque) by the thickness sensor, it is diverted from the direct transport path around a loop which includes reading means for reading machine-readable information, such as MICR characters, from it. After reading, the cheque returns to the direct transport path and so passes to the document deposit stack (in this system, all documents are deposited in the same depository cartridge).

The cheque can be circulated around the loop several times in an attempt to read it, with its registration and alignment being adjusted each time. If it is still unreadable (no read signals, or the read signals are not recognizable), the main transport path is reversed and the cheque is returned to the user.

For this system to work well, the discrimination between cheques and envelopes must be reliable; an envelope which is misidentified as a cheque causes a substantial delay as the system circulates it repeatedly while trying to read it until it is then rejected and returned to the user. However, this discrimination relies on accurate measurement of the thickness of the documents and reliable discrimination is difficult to achieve.

The known depository referred to above employs reading means for reading machine-readable characters. From U.S. Pat. No. 4,523,330, there is known a document processing apparatus including imaging means for generating a digital image of the document as it is moved past a scanning line, this digital image being stored for use in processing of the document. This last-mentioned apparatus is not concerned with distinguishing between envelopes and single sheet documents.

SUMMARY OF THE INVENTION

It is an object of the present invention to provide a depository apparatus in which reliable discrimination between envelopes and single sheet documents can be achieved.

According to the invention there is provided a depository apparatus including a common entry slot for receiving deposit items comprising envelopes and single sheet financial documents, thickness sensing means for providing an output indicative of whether a deposit item has at least a predetermined thickness, transport means and diverter means for transporting a deposit item along a common transport path and thereafter routing the deposit item into an envelope path for further processing as an envelope if the deposit item has at least said predetermined thickness, or into a financial document path for further processing as a financial document if the deposit item has less than said predetermined thickness, characterized by imaging means for generating a digital image of a deposit item routed into said financial document path, and processing means for processing said digital image to determine whether the deposit item is a financial document of predetermined type, the deposit item being returned to said common path if said processing means fails to determine that the deposit item is a financial document of said predetermined type.

A depository apparatus in accordance with the invention will now be described by way of example with reference to the accompanying specification, claims, and drawing.

DESCRIPTION OF A PREFERRED EMBODIMENT

Figure 1:
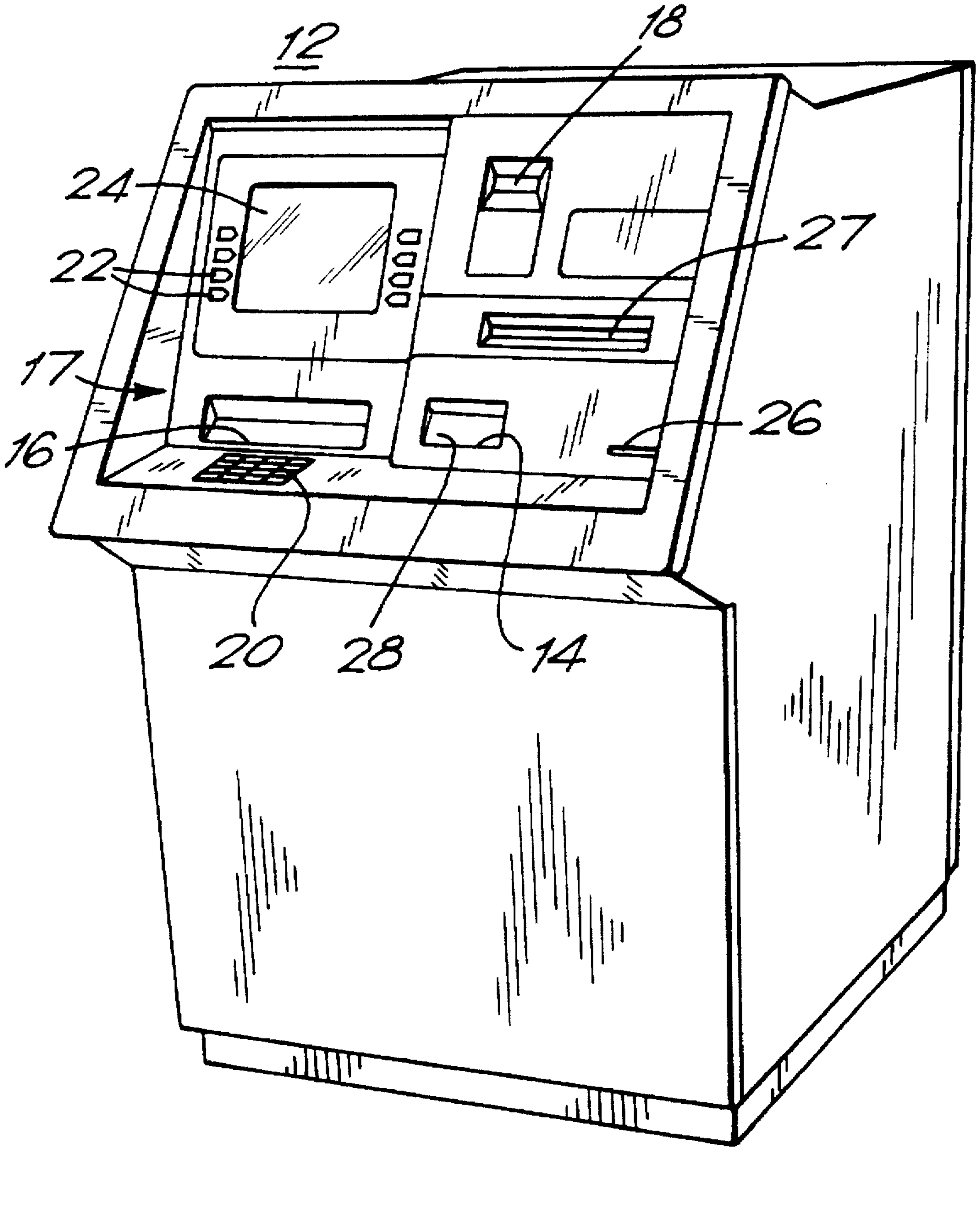
FIG. 1 is a perspective view of an ATM incorporating a depository apparatus made according to the invention.

Referring to the drawing, a depository 10 (FIGS. 2A and 2B) is incorporated in an ATM 12 (FIG. 1) adapted to accept deposit items, represented by envelopes containing money (currency notes and/or cheques) or single sheet financial documents such as cheques or payment slips, through an entry slot 14, and to dispense currency notes through a slot 16, the slots 14 and 16 being included in a user interface 17 of the ATM 12. It should be noted that, in the following description, the term document will be used to mean a single sheet financial document, and the term deposit item will be used to mean a deposited envelope or single sheet financial document. The user interface 17 also includes a card entry slot 18 through which a user of the machine inserts a customer identification card. A keyboard 20 and control keys 22 enable a user to enter data such as a personal identification number (PIN) and the required transaction details. A lead-through display screen 24 displays user instructions and other information. A receipt slot 26 through which receipts are issued to a user, and a slot 27 through which envelopes are dispensed on request to a user are also provided.

Figure 2A:
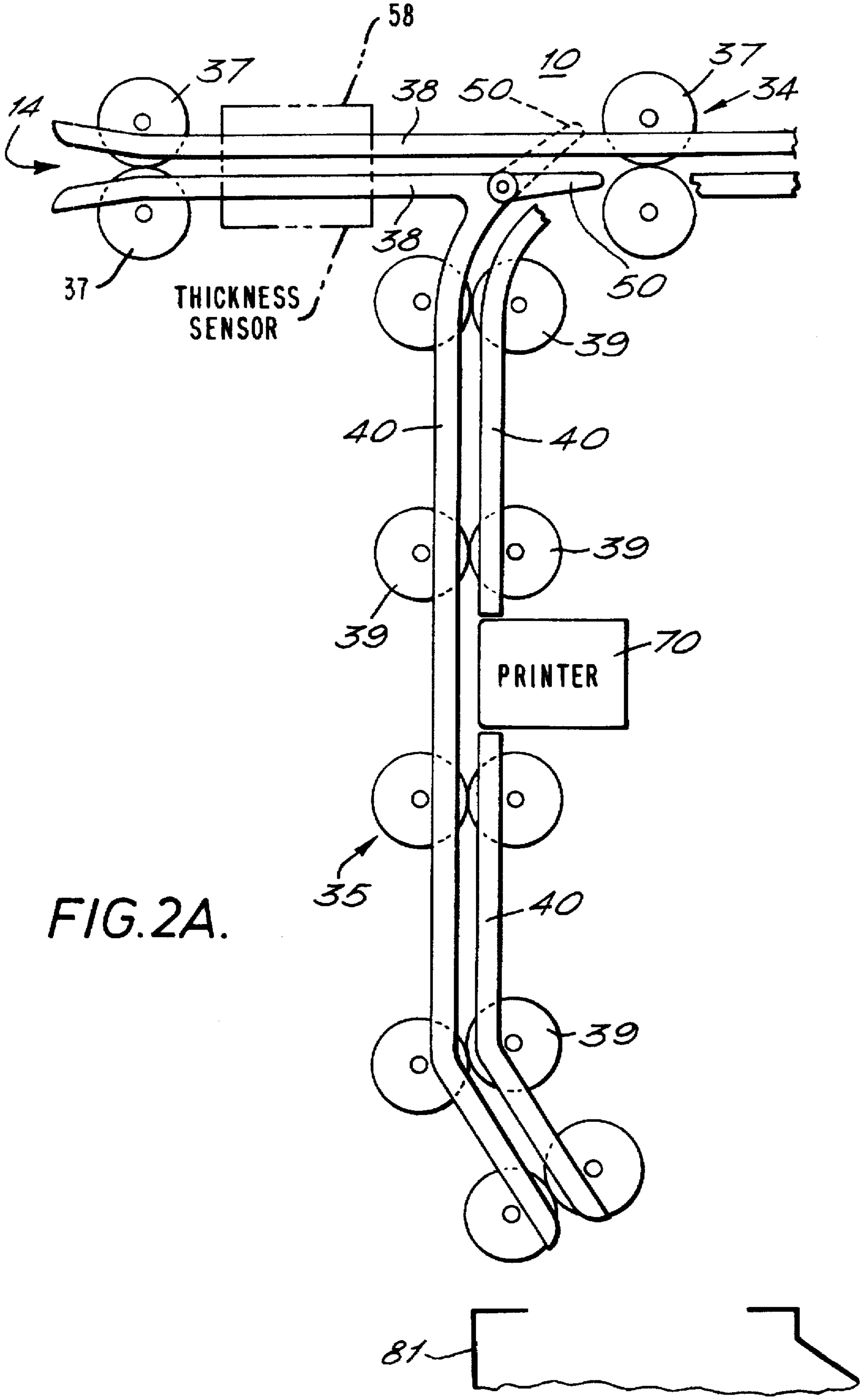
FIGS. 2A and 2B, taken together, are a schematic side elevational view of the depository apparatus.
Figure 3:
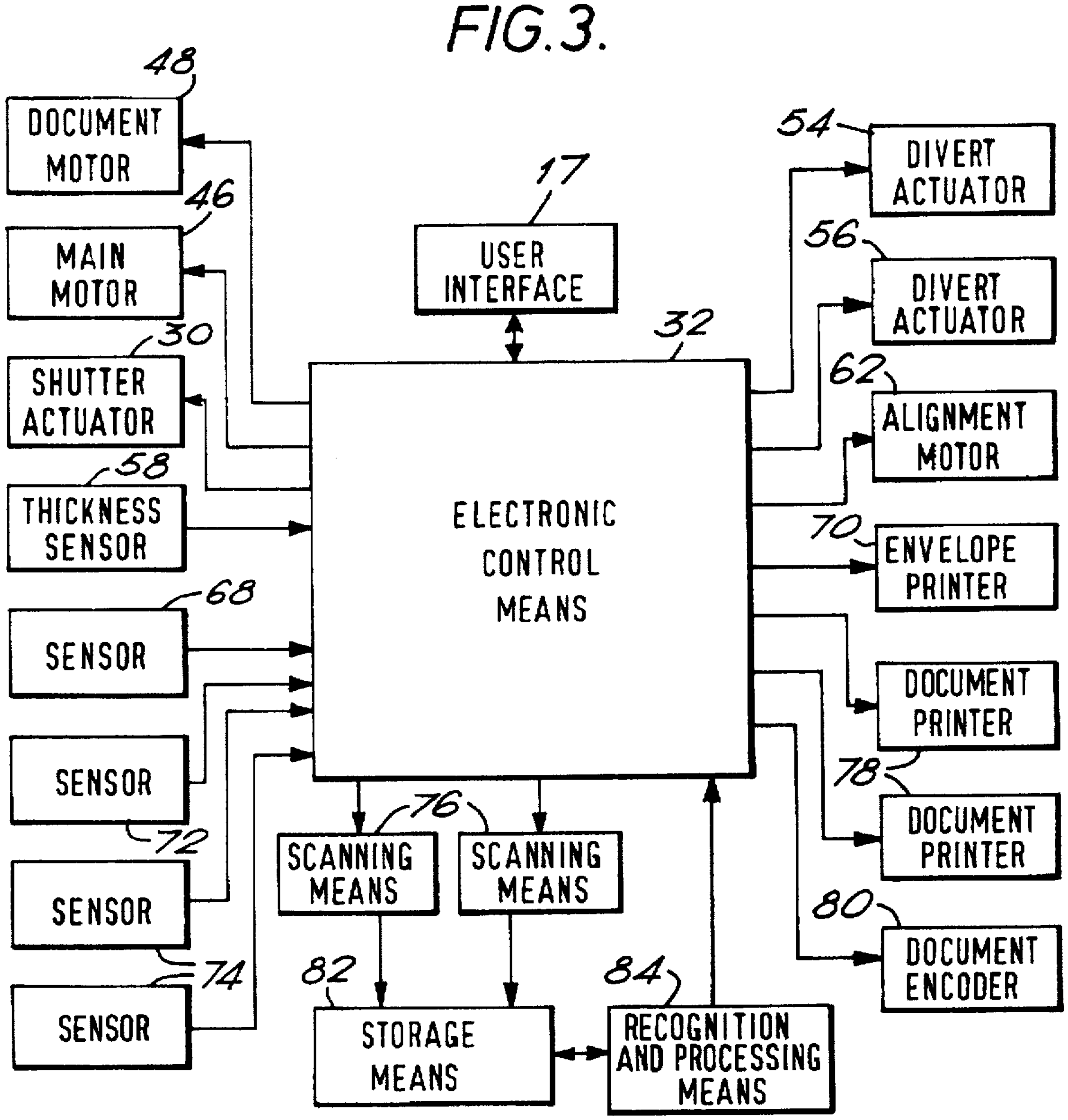
FIG. 3 is a schematic block diagram illustrating the electrical interconnections of parts of the depository apparatus.

The entry slot 14 for deposit items is normally closed by a shutter 28 (not shown in FIG. 2A) connected to an actuating mechanism 30 (FIG. 3). Operation of the actuating mechanism 30 serves to retract the shutter 28 from its closed position so as to permit deposit items to be inserted in the depository 10 through the slot 14. Operation of the actuating mechanism 30 along with operation of other elements of the ATM 12 is controlled by electronic control means 32, or controller, as indicated in FIG. 3.

Figure 2B:
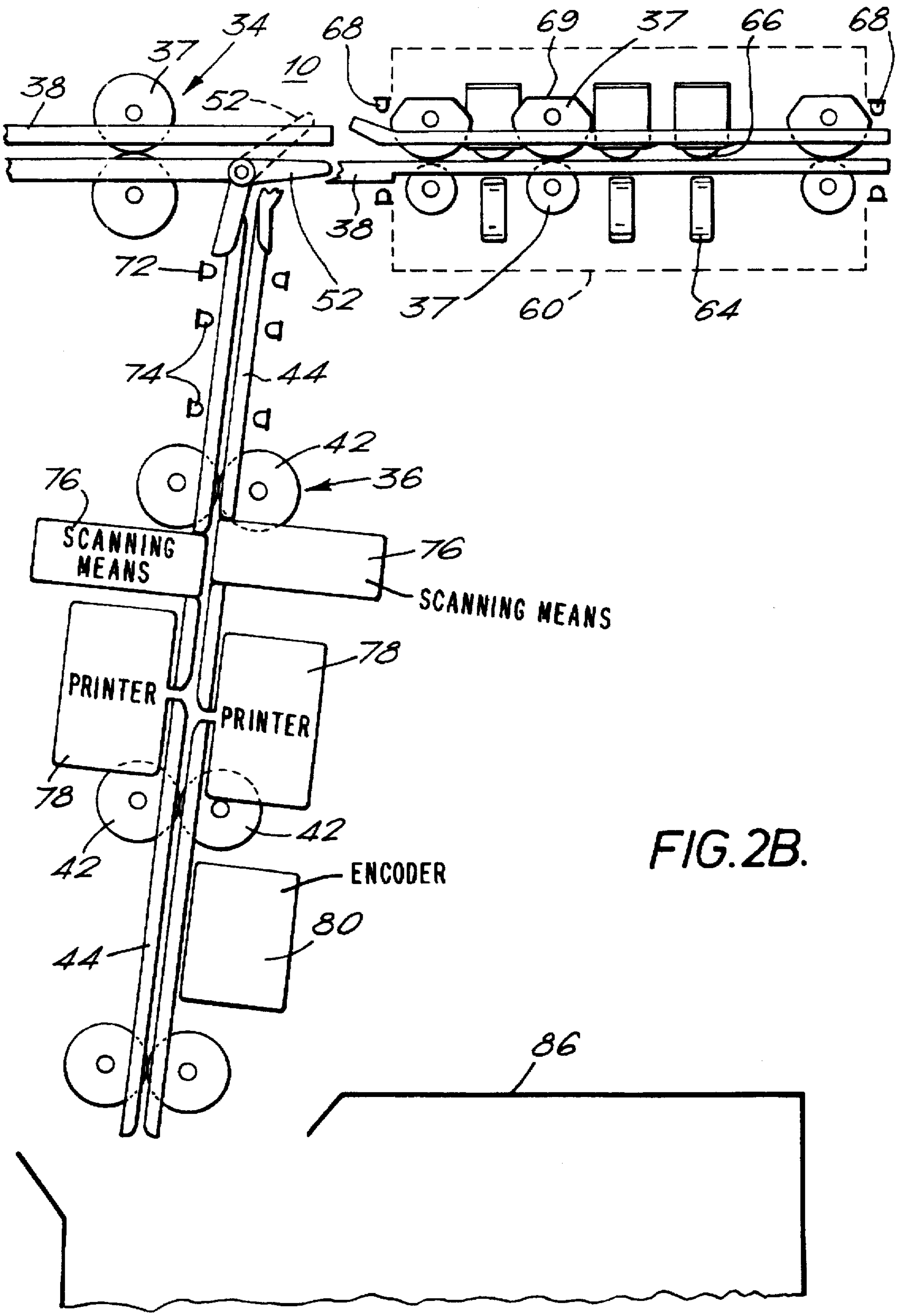

Referring now particularly to FIGS. 2A and 2B, the depository 10 has a transport mechanism which comprises a common transport section 34, an envelope transport section 35 and a document transport section 36. The common transport section 34 includes a first plurality of feed rolls 37 for transporting deposit items from the entry slot 14 along a common feed path defined by guide means 38. The envelope transport section 35 includes a second plurality of feed rolls 39 for transporting envelopes along an envelope feed path defined by guide means 40, and the document transport section 36 includes a third plurality of feed rolls 42 for transporting documents along a feed path defined by guide means 44. Each of the envelope and document feed paths branch off from the common feed path. The feed rolls 37 and 39 are driven by a main reversible transport motor 46 (FIG. 3), whereas the feed rolls 42 are driven by a separate reversible motor 48 (FIG. 3). A pivotably mounted divert gate 50 is positioned at the junction between the common feed path and the envelope feed path, and a further pivotably mounted divert gate 52 is positioned at the junction between the common feed path and the document feed path. The divert gates 50 and 52 are normally in the home positions shown in solid outline in FIGS. 2A and 2B, but are each selectively movable to an operational position shown in chain outline under the control of a respective associated actuator 54 or 56 (FIG. 3).

A thickness sensor 58 is positioned adjacent to the entry slot 14 of the depository 10, the sensor 58 being arranged to detect whether a deposit item has a thickness of at least one millimeter, which in the present embodiment is taken as being indicative that the deposit item is an envelope. If the thickness sensor 58 senses that a deposited item has a thickness of at least one millimeter, then it sends an appropriate output signal to the electronic control means 32. The thickness sensor 58 may be of known construction and operation. For example, the thickness sensor 58 may include two cooperating rolls (not shown) which are moved apart as a deposit item passes between them, the above-mentioned output signal being generated if the rolls are moved apart by at least one millimeter.

An alignment mechanism 60 is positioned adjacent to the end of the common feed path remote from the entry slot 14. The alignment mechanism 60 serves to align a deposit item which is a document by moving the document transversely relative to the common feed path so as to bring a long edge of the document into engagement with a reference surface (not shown) which is accurately parallel to the document feed path. When a document has been correctly aligned in this manner it has the correct orientation relative to the document feed path so that it is processed correctly as it is fed along the document feed path by the feed rolls 42. The alignment mechanism 60 is operated by an alignment motor 62 (FIG. 3). The alignment mechanism 60 may include cooperating gripper means 64 and 66 which are normally out of engagement with each other so as to allow free passage of a deposit item from left to right (with reference to FIGS. 2A and 2B) along the common feed path. When a deposit item reaches its rightmost position along the feed path, as sensed by optical sensors 68, its movement is stopped. If at this time the thickness sensor 58 has not generated an output signal, thereby normally indicating that the deposit item is a document, then the gripper means 64 and 66 are operated so as to engage with the document and move the document into engagement with the above-mentioned reference surface; when the gripper means 64 and 66 are operated, the feed rolls 37 are stopped, with flat peripheral portions 69 of upper feed rolls 37 included in the alignment mechanism 60 being out of engagement with the associated lower feed rolls 37. It should be understood that if the thickness generator 58 has generated an output signal, thereby normally indicating that the deposit item is an envelope, then the alignment mechanism 60 remains non-operative.

If the thickness sensor 58 indicates that the deposit item is an envelope, the divert gate 52 remains in its home position but the divert gate 50 is moved to its actuated position as shown in chain outline in FIG. 2A. The operation of the motor 46 is then reversed so as to cause the common transport section 34 to move the envelope back along the common feed path towards the entry slot 14. Before reaching the entry slot 14, the envelope is diverted by the diverter gate 50 into the envelope transport section 35.

Referring to FIG. 2A, an envelope printer 70 is associated with the envelope transport section 35. The printer 70 serves to print on an envelope fed along the envelope transport path appropriate information such as a serial number identifying the envelope, time and date.

Referring now particularly to FIG. 2B, if the thickness indicator 58 indicates that a deposit item is considered to be a document (i.e. that it has a thickness of less than one millimeter), then after the deposit item has been transported to the rightmost position along the common feed path the divert gate 52 is moved to its actuated position as shown in dotted outline. After having been aligned, the deposit item is moved by the common transport section 34 back along the common feed path towards the entry slot 14. Shortly after this reverse movement commences, the deposit item is diverted by the divert gate 52 into the document transport section 36.

Associated with the transport section 36 are a leading edge optical sensor 72 positioned adjacent to the entrance to the document transport section 36, side edge optical sensors 74, two scanning means 76 located on opposite sides of the document feed path and each including a respective line scan camera, two printers 78 also located on opposite sides of the document feed path, and a thermal encoder 80, all of these elements being coupled to the electronic control means 32. A predetermined time after the leading edge of a deposit item entering the document transport section 36 is sensed by the sensor 72, the item is stopped momentarily and the outputs of the side edge sensors 74 are checked by the electronic control means 32 in order to ascertain if the item is correctly aligned relative to the document transport path. (If both edge sensors 74 sense a side edge portion of the deposit item, then the item is correctly aligned). If the deposit item is not correctly aligned, the operation of the document transport motor 48 is reversed so as to feed the item back to the alignment mechanism 60 where the alignment operation is repeated. The procedure of aligning a deposit item and checking its alignment is repeated if necessary up to three times. If after three repeated alignment procedures the deposit item is still not correctly aligned, it is either fed back by the common transport section 34 along the common feed path to the entry slot 14 for collection by the user, or the item is diverted by the divert gate 50 into the envelope transport section 35 for feeding to an envelope bin 81 from where it can be collected for manual processing.

If after entering the document transport section 36 a deposit item is found to be correctly aligned, then the line scan cameras included in the scanning means 76 are switched on and the document transport section 36 recommences feeding of the deposit item along the document feed path, the item moving past the cameras of the scanning means 76. Each of the cameras scans along a fixed line transverse to the direction of movement of the deposit item, with the movement of the item along the document feed path effectively providing the second direction of scanning. The scanning carried out by each of the scanning means 76 generates in known manner a stream of bits of data which are stored in associated storage means 82 (FIG. 3) to build up a two dimensional digital image of each side of the deposit item. After the scanning procedure has been completed, the deposit item is again temporarily stopped and the stored digital images are read by associated recognition and processing means 84. At the same time, the scanning means 76 enable a grey scale visual image of the deposit item to be displayed on the screen 24. The recognition and processing means 84 determines if the deposit item is a cheque by ascertaining whether a sort code, an account number and a cheque number are present at predetermined locations on one side of the cheque. The recognition and processing means 84 also determines if the deposit item is a payment slip by ascertaining whether certain information is present at predetermined locations on both sides of the deposit item. In addition, the recognition and processing means 84 checks whether the deposit item has been fully completed by the user (e.g. by being signed, dated and having amount information entered thereon in the case of a cheque), and whether the deposit item has been inserted into the entry slot 14 with the correct orientation so that it has the correct orientation relative to the scanning means 76 for proper processing. If the deposit item has not been fully completed or is incorrectly orientated, this situation will normally be made apparent to the user by virtue of the visual image of the deposit item displayed on the screen 24. If such situation is found to exist, then the operation of the document transport motor 48 is reversed so as to return the deposit item to the common feed path, after which the item is driven back along the common feed path by the common transport section 34 for return to the user via the entry slot 14. The user then has the opportunity to complete the deposit item or orient it correctly, as the case may be, prior to reinserting the item into the entry slot 14.

If the recognition and processing means 84 determines that a deposit item is a financial document of predetermined type (i.e. a cheque or payment slip of a type recognized by the recognition and processing means 84) and that the document has been fully completed and has the correct orientation, then after being given the opportunity to view the image of the document on the screen 24 the user is requested by a message on the screen 24 to confirm by operation of one of the control keys 22 that processing of the document should continue. If the user makes such confirmation, then the relevant information carried by the document is processed in known manner by the recognition and processing means 84, and feeding of the document along the document feed path by the document transport section 36 is resumed. If the user fails to make such confirmation, then the document is returned to the user in the manner previously described.

It can happen that an envelope inserted into the entry slot 14 is sufficiently thin (particularly if it contains only a single currency note or a single cheque) that it fails to cause the thickness sensor 58 to generate an output signal indicative of a deposit item thickness of at least one millimeter. In this case the depository apparatus 10 treats the envelope as a single sheet financial document so that it is diverted by the divert gate 52 into the document transport section 36. Assuming that the envelope has the correct alignment it is transported past the scanning means 76 so as to cause digital images to be generated on both sides of the envelope as described above. Envelopes dispensed by the envelope dispenser of the ATM 12 each carry an envelope identification mark in a fixed location on the envelope. The recognition and processing means 84 stores a reference image of this identification mark so that if the user has used an envelope dispensed by the ATM 12 as a deposit item the recognition and processing means 84 recognizes the deposit item as an envelope. In this case the operation of the document motor 48 is reversed so as to return the envelope to the common feed path, after which the envelope is driven back along the common feed path and diverted by the divert gate 50 into the envelope transport section 35 for processing in normal manner as an envelope.

If the recognition and processing means 84 fails to recognize a deposit item as being either a cheque or a payment slip or an envelope (which may happen if a non-standard cheque or payment slip or an envelope not dispensed by the ATM 12 has been deposited by the user), then again the operation of the document motor 48 is reversed so as to return the deposit item to the common feed path. Again the deposit item is driven back along the common feed path by the common transport section 34 but in this case the divert gate 50 remains in its home position so that the deposit item is returned to the entry slot 14 for collection by the user.

As mentioned above, if the recognition and processing means 84 determines that a deposit item is a cheque or payment slip, the feeding of the document along the document feed path is resumed. During this further movement, the document passes the printers 78 which carry out a printing operation on both sides of the document. The printed information may, for example, comprise a serial number identifying the document, date, time and ATM location. During a printing operation, each of the printers 78 is moved by an associated motor across the whole width of the document. The document then moves past the thermal encoder means 80. If the document is a cheque and the recognition and processing means 84 has been able to read the monetary amount written on the cheque, then the encoder means 80 prints a code line representing this amount in magnetic ink on the cheque. Finally, the document is fed by the document transport section 36 to a document bin module 86 where the document is stacked in orderly manner in an appropriate pocket of the bin module 86.

In operation of the depository apparatus 10, a user inserts his identification card into the card entry slot 18 and enters his PIN on the keyboard 20. A deposit transaction is then requested by the user using the control keys 22 and, if desired, he can request the ATM 12 to dispense an envelope, again by using the control keys 22. In response to the deposit transaction request being made, the shutter 28 is retracted by the actuating mechanism 30 and the user can then insert a deposit item into the entry slot 14. If the deposit item is identified by the depository apparatus 10 as an envelope, the envelope is directed into the envelope transport section 35, wherein information is printed thereon by the printer 70, the envelope being eventually deposited in the envelope bin 81. If the deposit item is identified by the recognition and processing means 84 as a document then an image of the document is displayed on the screen 24 as previously described. Providing the user confirms that he wishes the document deposit transaction to proceed, by use of one of the control keys 22, processing of the document continues, with the document being eventually deposited in the document bin module 86. If a deposit item fed into the document transport section 36 is incorrectly orientated, or fails to be correctly aligned, or fails to be identified as a cheque or payment slip or envelope, then the item is returned to the user via the entry slot 14. The user then has the choice of reinsetting the item in the entry slot 14, placing the item in an envelope before inserting it in the slot 14, or retaining the item.

In an alternative arrangement to that described above, the depository apparatus could be adapted to accept and process other single sheet financial documents in addition to cheques and payment slips.

The depository apparatus described above has the advantage that it can reliably discriminate between single sheet financial documents and thin envelopes containing only a single sheet.

What is claimed is:

1. A depository apparatus comprising:

a user interface having a common entry slot therein for receiving deposit items comprising envelopes and single sheet financial documents;

thickness sensing means for providing an output indicative of whether a deposit item has at least a predetermined thickness;

a common transport path for receiving deposit items comprising envelopes and single sheet financial documents;

an envelope path for receiving deposit items which have been determined by the thickness sensing means to have thickness at least the predetermined thickness;

a document path for receiving deposit items which have been determined by the thickness sensing means to have thickness less than the predetermined thickness;

transport means and diverter means for (i) transporting a deposit item along the common transport path and thereafter routing the deposit item into the envelope path for further processing as an envelope if the deposit item has at least the predetermined thickness, or for (ii) transporting the deposit item into the document path for further processing as a financial document if the deposit item has less than the predetermined thickness;

imaging means located along the document path for generating a digital image of a deposit item routed into the document path; and processing means for processing the digital image to determine whether the deposit item is a financial document of a predetermined type, the deposit item being returned from the document path to the common path if the processing means fails to determine that the deposit item is a document of the predetermined type.

2. A depository apparatus according to claim 1, wherein the processing means includes circuitry to determine whether a deposit item is a financial document of the predetermined type by checking whether appropriate information is present at certain locations on the deposit item.

3. A depository apparatus according to claim 2, wherein the transport means includes means for returning to the entry slot along the common feed path a single sheet document which has failed to be recognized as a financial document of the predetermined type by the processing means.

4. A depository apparatus comprising:

a user interface having a common entry slot therein for receiving deposit items being either an envelope or a single sheet, a display, and a keyboard for entering data;

a common transport path;

an envelope path;

a sheet path;

sensors for determining whether a deposit item is an envelope or a single sheet;

a first deposit item transport for moving a deposit item along the common transport path;

a second deposit item transport for moving a deposit item which has been determined by the sensors to be an envelope along the envelope path;

a third deposit item transport for moving a deposit item which has been determined by the sensors to be a single sheet along the sheet path;

an aligner for aligning a deposit item which has been determined by the sensors to be a single sheet for processing by an imager;

an imager for generating an image of at least one side of the aligned deposit item which has been determined by the sensors to be a single sheet; and a controller for (i) displaying the image on the display to enable a user to control processing of the aligned deposit item which has been determined by the sensors to be a single sheet via the keyboard, (ii) determining whether the single sheet is of a predetermined type based upon the image, and (iii) returning the single sheet to the user through the entry slot if the controller determines that the single sheet is not of a predetermined type.

5. A depository apparatus according to claim 4, wherein:

the sensors determine a thickness of the deposit item, the thickness being used by the controller to control the disposition of the deposit item from the first deposit item transport to the second deposit item transport if the thickness is at least equal to a predetermined thickness indicating that the deposit item is an envelope, and to control the disposition of a deposit item from the first deposit item transport to the third deposit item transport if the thickness is less than the predetermined thickness indicating that the deposit item is a single sheet.

6. A depository apparatus as claimed in claim 5, wherein the aligner is located in the first deposit item transport and the imager is located along the third deposit item transport.

7. A depository apparatus comprising:

a user interface having a common entry slot therein for receiving deposit items comprising envelopes and single sheet financial documents;

thickness sensing means for providing an output indicative of whether a deposit item has at least a predetermined thickness;

a common transport path;

an envelope path;

a document path;

transport means and diverter means for (i) transporting the deposit item along the common transport path and thereafter routing the deposit item into the envelope path for further processing as an envelope if the deposit item has at least the predetermined thickness, or for (ii) transporting the deposit item into the document path for further processing as a financial document if the deposit item has less than the predetermined thickness;

imaging means for generating a digital image of a deposit item routed into the document path; and processing means for processing the digital image to determine whether the deposit item is a financial document of a predetermined type, the deposit item being returned to the common path if the processing means fails to determine that the deposit item is a document of the predetermined type;

the processing means including circuitry to determine whether a deposit item is a financial document of the predetermined type by checking whether appropriate information is present at certain locations on the deposit item;

the transport means including means for returning to the entry slot along the common feed path a single sheet document which has failed to be recognized as a financial document of the predetermined type by the processing means;

the processing means including circuitry to determine whether a deposit item is an envelope of predetermined type;

the transport means including means for transporting the envelope to the envelope path.

8. A depository apparatus according to claim 7, wherein the user interface has a display means for displaying to the user a visual image of a deposit item whose digital image has been generated.

9. A depository apparatus according to claim 8, wherein the user interface further includes data entry means for enabling the user to authorize further processing of a deposit item whose associated visual image is displayed on the display means.

10. A depository apparatus according to claim 9, wherein the processing means includes means for determining whether a financial document has been fully completed by the user; and the transport means being controlled by the processing means to return to the entry slot along the common feed path a financial document which has been found by the processing means not to have been fully completed.

11. A depository apparatus according to claim 10, wherein the processing means is effective to:

determine whether a financial document is incorrectly oriented with respect to the imaging means;

control the transport means; and return to the entry slot along the common feed path a financial document which has been found by the processing means to be incorrectly oriented.

12. A depository apparatus according to claim 11, wherein the imaging means includes at least one line scan camera.

13. A depository apparatus according to claim 12, further comprising aligning means for aligning with reference to a reference surface a deposit item of less than the predetermined thickness prior to routing the deposit item to the financial document path.

14. A depository apparatus according to claim 13, wherein the predetermined thickness is about one millimeter.

* * * * *